(12) United States Patent
Taylor et al.

(10) Patent No.: US 7,423,635 B2
(45) Date of Patent: Sep. 9, 2008

(54) SINGLE-LAYER TOUCHPAD HAVING TOUCH ZONES

(75) Inventors: Brian Taylor, Sandy, UT (US); David Taylor, Salt Lake City, UT (US); Michael D. Layton, Salt Lake City, UT (US)

(73) Assignee: Cirque Corporation, Salt Lake City, UT (US)

( * ) Notice: Subject to any disclaimer, the term of this patent is extended or adjusted under 35 U.S.C. 154(b) by 540 days.

(21) Appl. No.: 11/213,176

(22) Filed: Aug. 26, 2005

(65) Prior Publication Data

US 2005/0280639 A1    Dec. 22, 2005

(51) Int. Cl.
*G09G 5/00* (2006.01)
(52) U.S. Cl. ........................................ 345/174; 345/173
(58) Field of Classification Search ................. 345/173, 345/174; 178/18.03–18.05
See application file for complete search history.

(56) References Cited

U.S. PATENT DOCUMENTS

| | | | | |
|---|---|---|---|---|
| 5,159,159 A | * | 10/1992 | Asher | 178/18.05 |
| 5,543,589 A | * | 8/1996 | Buchana et al. | 178/18.03 |
| 5,543,590 A | * | 8/1996 | Gillespie et al. | 178/18.06 |
| 6,504,530 B1 | * | 1/2003 | Wilson et al. | 345/173 |
| 6,633,279 B1 | * | 10/2003 | Kono et al. | 345/173 |
| 2002/0015024 A1 | | 2/2002 | Westerman et al. | |
| 2002/0093491 A1 | | 7/2002 | Gillespie et al. | |

* cited by examiner

*Primary Examiner*—Ricardo L Osorio
(74) *Attorney, Agent, or Firm*—Morriss O'Bryant Compagni

(57) ABSTRACT

A single-layer touchpad comprised of a relatively clear substrate, a first active electrode disposed thereon, and a sense electrode disposed thereon, wherein the first active electrode and the sense electrode are comprised of a conductive material, wherein the first active electrode in combination with the sense electrode are used to detect the presence of a pointing object in a zone, determining in which zone the pointing object has been detected, or the simultaneous presence of multiple pointing objects in multiple zones, and wherein the first active electrode and/or the sense electrode are made sufficiently visible so that a pattern is visually detectable to the user when looking at the display screen.

20 Claims, 4 Drawing Sheets

SINGLE-LAYER TOUCHPAD HAVING TOUCH ZONES

HISTORY OF THE APPLICATION

This application is a non-provisional that claims priority to a provisional application having U.S. Ser. No. 60/400,843.

BACKGROUND OF THE INVENTION

1. Field of the Invention

This invention relates generally to touchpads. More specifically, the invention relates to clear touchpads that can be disposed over a viewing or display screen such as on a computer monitor, a PDA or a mobile telephone, wherein the touchpad is capable of determining which zone a user is touching on the display screen.

2. Description of Related Art

The state of the art of touchpads has become more varied as new applications and devices have been created to use them. A touchpad is fundamentally a touch-sensitive device, generally found to be operating using the principles of resistance sensing, capacitance sensing, optical sensing or other means of sensing touch.

As experimentation with touchpads has increased, it was determined that touchpads can be disposed over a clear substrate, where the electrodes that define the sensory boundaries of the touchpad are made from clear or nearly clear inks, such as indium tin oxide (ITO). The electrodes can also be made from very thin wires, although this method introduces some difficulties. Thus with a relatively see-through or clear touchpad, it can be disposed over a display screen and operated much like a touchscreen as known in the prior art.

The substrate upon which the electrodes of the clear touchpad are disposed can be rigid or flexible, but as a practical matter, the substrate should be relatively thin. A thin substrate simply helps to make the clear touchpad as transparent as possible. Transparency is important because of the nature of the display screen that is likely to be underneath the clear touchpad. In other words, the display screen may not be a particularly bright screen. Thus, in order to help the user by not increasing eye strain, the display screen should be dimmed as little as possible from passing through the substrate and electrodes of the clear touchpad.

Good materials for substrates that are relatively clear and through which a user can see a display screen include KAPTON®, MYLAR™, KADADEX®, polyethylene napthalate (PEN®) and other materials having similar mechanical and electrical properties.

The focus of this document is directed towards a clear touchpad. The preferred embodiment is thus for a clear touchpad that provides limited touchpad functionality, defined herein as zone detection. However, clear touchpads are not limited to single layer touchpads. Therefore, this document also addresses a touchpad having complete touchpad functionality by using two layers of touchpad electrodes.

Complete touchpad functionality is generally characterized as providing cursor control for a computer, television, or a portable electronic appliance such as a PDA, camera, mobile telephone, etc. Accordingly, such a touchpad requires at least two layers of sensing electrodes when the touchpad uses capacitance sensing technology, such as that provided by CIRQUE CORPORATION. Multiple substrate layers and thus multiple or overlapping layers of electrodes generally results in a touchpad that is mostly transparent, but can be difficult to see through. This becomes a problem of usability when the touchpad is disposed on the display screen.

It is worth noting that attempts have been made to make the substrate layers and the inks used for electrical traces to be thinner and therefore to have greater apparent transparency. The attempts so far have still resulted in a display screen that is uncomfortably dimmed by the touchpad electrodes.

Accordingly, what is needed is a touchpad providing complete touchpad functionality that is more transparent than those in the state of the art in order to provide greater viewing comfort to the user.

BRIEF SUMMARY OF THE INVENTION

It is an object of the present invention to provide a touchpad that includes only one active electrode and one sense electrode on a single substrate, thereby improving display screen clarity by reducing the total number of electrodes used in the touchpad.

It is another object to provide the one active electrode in a plurality of different locations within the sensor area of the touchpad.

It is another object to provide the one active electrode and the one sense electrode on a generally transparent substrate.

It is another object to provide the one active electrode and the one sense electrode as generally transparent ITO ink.

It is another object to provide the single-layer touchpad wherein the touchpad is capable of detecting an object touching a zone, and determining in which zone the object has been detected.

It is another object to provide the single-layer touchpad wherein the touchpad is capable of simultaneously detecting the presence of multiple objects touching a plurality of different zones of the touchpad.

It is another object to provide the single-layer touchpad wherein the one active and the sense electrodes of the touchpad are arranged in a desirable pattern, and wherein the desired pattern is made visible when viewing the display screen, but with minimal interference.

In a preferred embodiment, the present invention is a single-layer touchpad comprised of a relatively clear substrate, a first active electrode disposed thereon, and a sense electrode disposed thereon, wherein the first active electrode and the sense electrode are comprised of a conductive material, wherein the first active electrode in combination with the sense electrode are used to detect the presence of a pointing object in a zone, determining in which zone the pointing object has been detected, or the simultaneous presence of multiple pointing objects in multiple zones, and wherein the first active electrode and/or the sense electrode are made sufficiently visible so that a pattern is visually detectable to the user when looking at the display screen.

These and other objects, features, advantages and alternative aspects of the present invention will become apparent to those skilled in the art from a consideration of the following detailed description taken in combination with the accompanying drawings.

DETAILED DESCRIPTION OF THE INVENTION

Reference will now be made to the drawings in which the various elements of the present invention will be given numerical designations and in which the invention will be discussed so as to enable one skilled in the art to make and use the invention. It is to be understood that the following description is only exemplary of the principles of the present invention, and should not be viewed as narrowing the claims which follow.

When discussing features of touchpads, it was mentioned that cursor control is often a desired function of complete functionality touchpads. Other desired functions include scrolling capabilities and navigation keys for moving through documents or controlling navigation through pages in a web browser. However, these features are not always required in the particular device for which the touchpad is being used.

Returning to the clear touchpad that was first described, the present invention provides touch zone control in a capacitance sensitive limited functionality touchpad. Touch zone control is a useful feature wherein the clear touchpad of the present invention sends data to a device such as a portable electronic appliance having a display screen as mentioned above.

Figure 1:
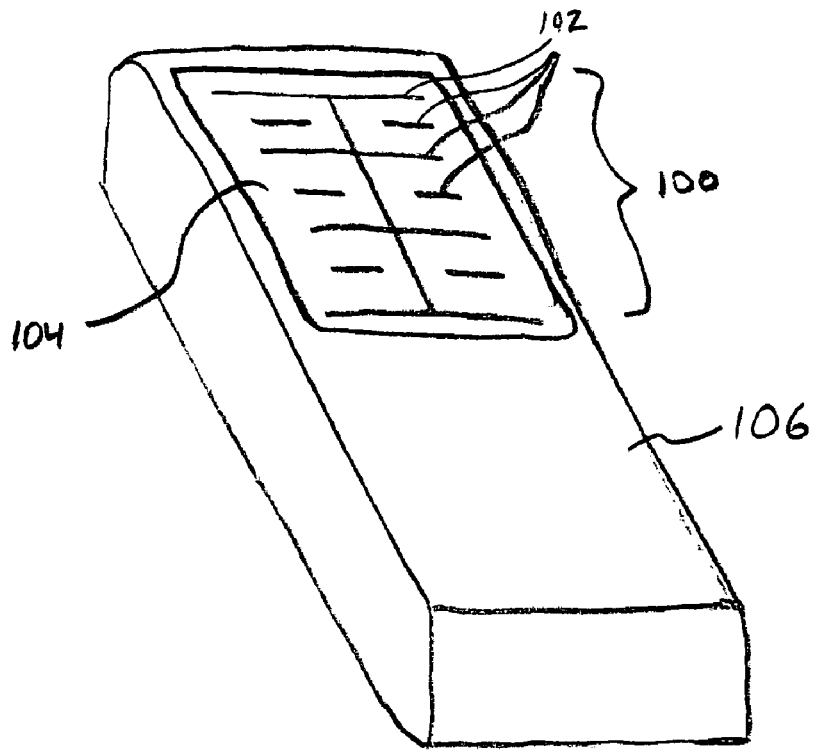
FIG. 1 is a perspective view of a portable electronic appliance having a display screen and a clear touchpad disposed thereon to provide input.

In FIG. 1, a clear touchpad 100 shown as various electrodes 102 is disposed over a display screen 104. The display screen 104 and clear touchpad 100 are part of a portable electronic appliance 106. The portable electronic appliance can be any mentioned previously in this document, or any other type of device having a display screen that can take advantage of touchpad input. It is noted that the various electrodes 102 are shown without the detail of the electrical connections required to make the clear touch pad functional. These electrical connections are shown in subsequent figures. Furthermore, the various electrodes 102 are shown as very dark lines on the display screen 104. This exaggeration of the darkness of the various electrodes 102 is for illustration purposes only. It should be remembered that the inks or other conductive materials being used for the various electrodes 102 are relatively transparent to the user.

The clear touchpad 100 shown in FIG. 1 is also notable in that it defines distinct and separate zones as will be shown in greater detail. Data sent by sensing circuitry associated with the clear touchpad 100 indicates to the portable electronic appliance 106 the detection of contact by a pointing object. The pointing object can be a finger or other object that can be detected by a capacitance sensitive clear touchpad 100. In addition, the clear touchpad 100 can also indicate in which zone the contact has occurred.

Accordingly, the present invention provides the functionality of a one dimensional input device. For example, the clear touchpad 100 can provide the input of buttons. Each separate area, zone, button or region is a single button. By detecting which area, zone, button or region has been touched, a distinct operation can be performed by the portable electronic appliance.

Figure 2:
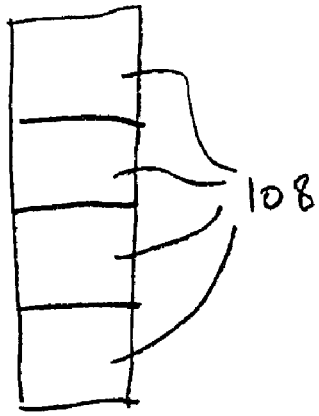
FIG. 2 is an illustration of zones arranged as a column to provide scrolling input.

Another example of a one dimensional input is a slide or scroll control. FIG. 2 illustrates that if the zones 108 are lined up to form a column, then movement from zone to zone can be detected as discrete steps. If more sophisticated touchpad circuitry is provided, then it may be possible to determine finer movement along the column, and thus provide smaller incremental movement along the column.

Figure 3:
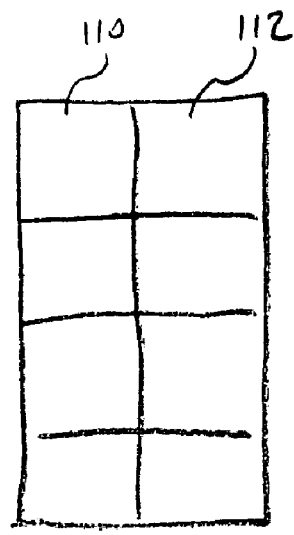
FIG. 3 is an illustration of two parallel columns of zones for providing scrolling control for two different inputs.

Furthermore, more than one column may be provided as shown in FIG. 3, so that multiple scrolling regions can be controlled by the same clear touchpad as demonstrated by columns 1 (110) and 2 (112), parallel clear touchpads, perpendicular clear touchpads, or some other arrangement of zones as may be desired. The pattern or layout of one dimensional regions or zones may be quite varied, and should not be considered a limiting factor of the present invention.

Figure 4:
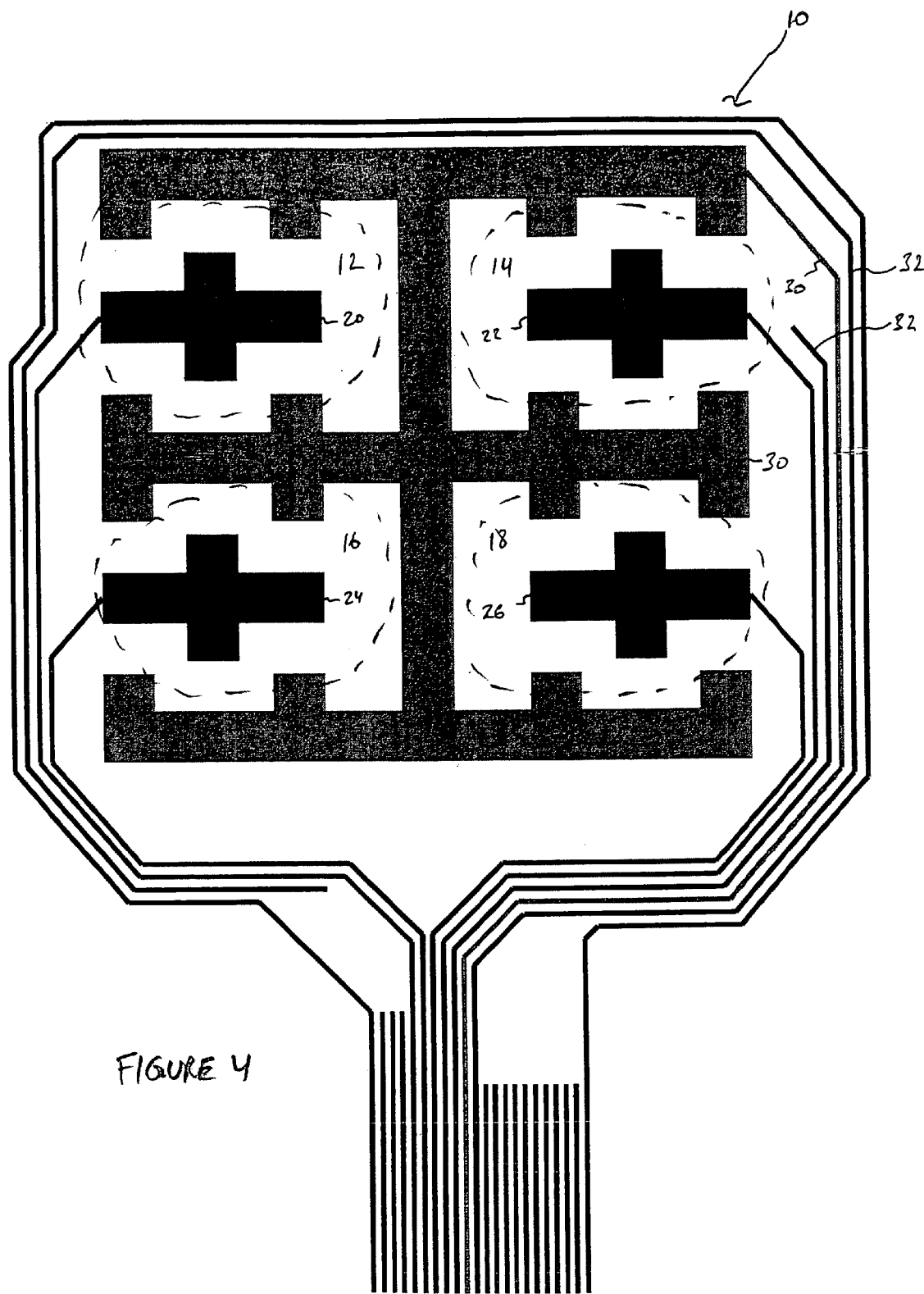
FIG. 4 is an enlarged schematic diagram of the layout of electrodes for a clear touchpad that is made in accordance with the principles of the present invention.

FIG. 4 is an enlarged schematic layout of the presently preferred embodiment of the invention. FIG. 4 shows a single-layer substrate 10 which is assumed to be the plane of the figure. Only a single active electrode (X or Y) is needed to detect touching in a zone. Assume that the electrodes 20, 22, 24, 26 are X electrodes. FIG. 4 has four zones 12, 14, 16, 18. These four zones are defined only generally be the dotted lines that include each of the item numbers. The four zones 12, 14, 16, 18 are comprised of the corresponding electrodes 20, 22, 24, 26 and the space around them, out to the one sense electrode 30. Notice that the sense electrode 30 is surrounded by a grounding ring 32 that shields the one sense electrode from signals on other electrode wires or other interference.

The present invention operates when the active electrodes 20, 22, 24, 26 and the one sense electrode 30 are coupled to a touchpad sensing circuit associated with the clear touchpad 10. The touchpad sensing circuit may be the circuit sold by Cirque® Corporation in its touchpads. It is noted that a touchpad sensing circuit that is designed for providing complete touchpad functionality can be used in a clear touchpad having a single layer. However, the touchpad sensing circuitry can also be modified to operate more efficiently without an input for an active electrode that is not being used when only providing limited touchpad functionality.

An important aspect of the present invention is to also provide the feature of shaping the active electrode, the one sense electrode, or both the active and the one sense electrodes in desirable patterns. It was stated earlier that it is desirable to make the electrodes as transparent to the user as possible in order to avoid dimming a display screen. However, it may be desirable to make at least a portion of the electrodes visible to a user when looking at the display screen.

Thus, an important aspect of the invention is the ability to make visible a desirable pattern as seen when looking at the display screen. Assuming that a single-layer touchpad has been disposed between the display screen and the user, or the touchpad is visible from the underside of the display screen, it may be desirable that the touchpad not be made completely transparent to the user.

For example, the electrodes of the touchpad can be made visible to the user by taking advantage of certain characteristics of the materials used in them. Consider a conductive material for the electrodes whose width or thickness can be varied in order to obtain various degrees of visibility. Furthermore, additional materials may be added to the conductive material used for the electrodes, wherein the additional materials darken or lighten the appearance of the conductive material.

The purpose of increasing the opacity of the electrodes would seem to be contrary to the goal of making the presence of the clear touchpad unnoticeable. However, making the electrodes at least partially visible in at least one zone enables a seller of a device to make a particular image visible to users of buyers of its product. In other words, the seller can brand the device so that there is no mistake as to the seller of the device when a logo or other service or trademark is visually discernible to the user or buyer.

Using the illustration of FIG. 4, assume that the logo of the seller is the shape of one of the electrodes 20, 22, 24, or 26. One or all of these electrodes 20, 22, 24, 26 could be made slightly visible when looking at the display screen.

The number of zones that can be provided by the clear touchpad can be modified as well, depending upon the characteristics of the clear touchpad being used. The number of zones should not be considered a limiting factor, as the touchpad and its associated touchpad sensing circuitry can be modified to provide many distinct zones if desired.

Figure 5:
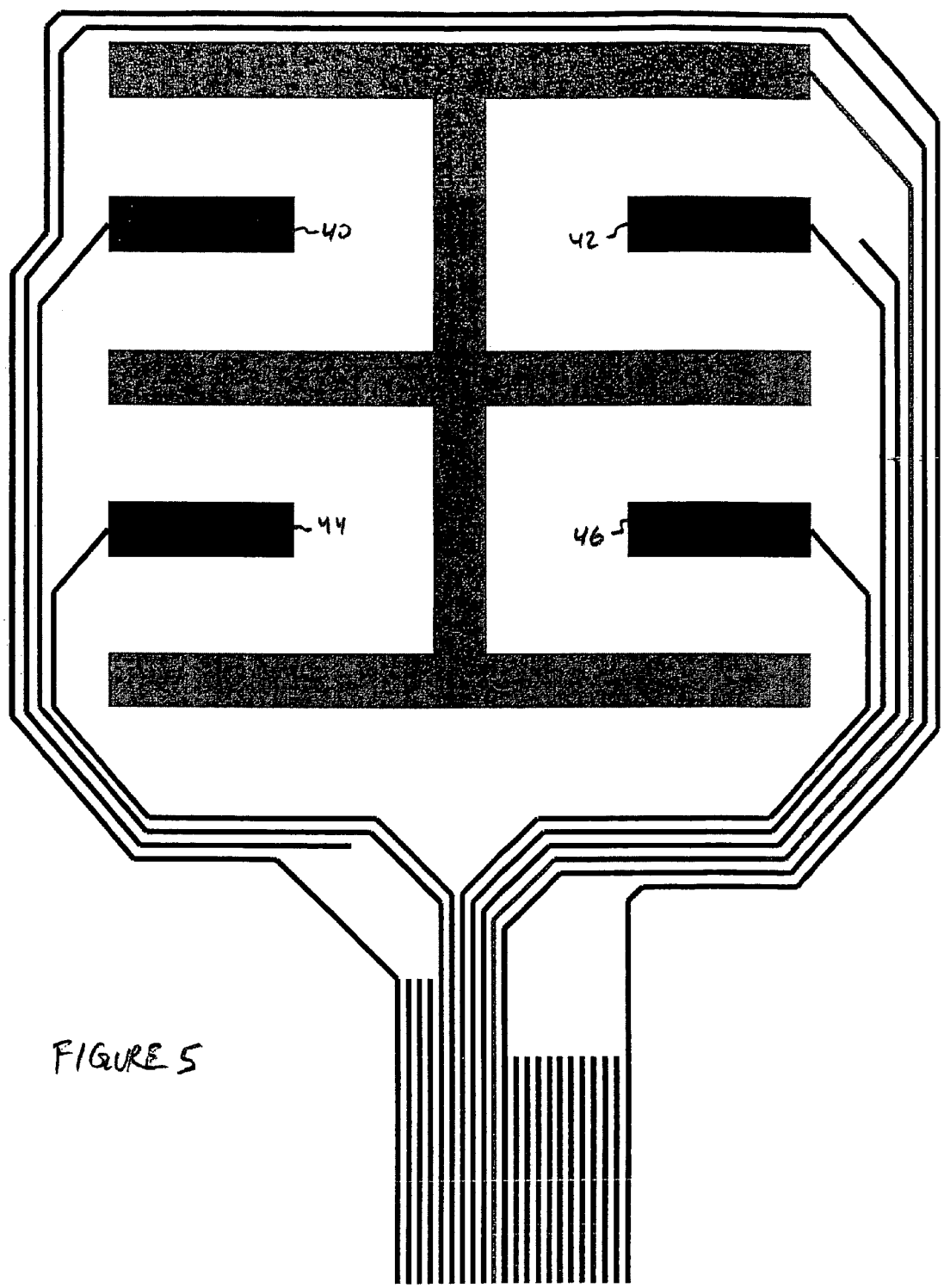
FIG. 5 is an enlarged schematic diagram of a different layout of electrodes for a clear touchpad.

FIG. 5 is an enlarged schematic block diagram of another clear touchpad of the present invention. Note that the shape of the active electrodes 40, 42, 44, 46 are different from those of FIG. 4. This is simply to make it plain that the shape of the electrodes can be modified to be many desirable shapes and patterns.

Figure 6:
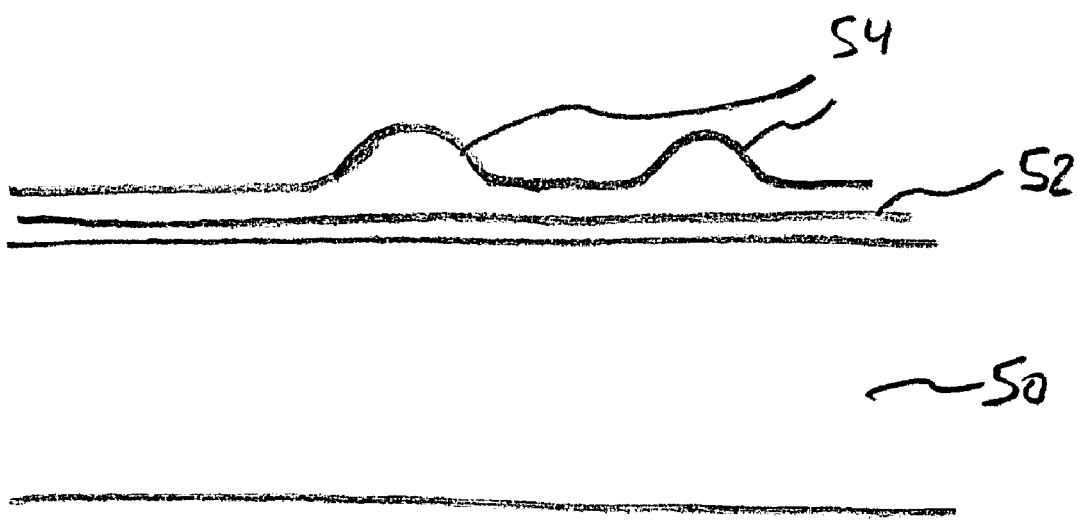
FIG. 6 is an enlarged cross-sectional view of a clear touchpad having mechanical dome switches disposed thereover.

Another important aspect of the invention is that the functionality of the clear touchpad can be combined with other mechanical features. For example, one desirable mechanical feature might be a dome button. FIG. 6 is an enlarged and cross-sectional illustration of this concept, wherein a touchpad substrate 50 is shown. The substrate 50 has disposed thereon a desired pattern or layout of electrodes 52 of the clear touchpad. Disposed over these electrodes are mechanical dome switches 54. The functionality provided by the electrodes 52 may be that of a provide a different function in the same space. However, the electrodes 52 might also function as buttons. Thus, there could be dual use of the same area. If the electrodes are active, then an electrode switch might be actuated. If the electrodes are inactive, then the mechanical dome switches may be actuated to provide a different input.

It is to be understood that the above-described arrangements are only illustrative of the application of the principles of the present invention. Numerous modifications and alternative arrangements may be devised by those skilled in the art without departing from the spirit and scope of the present invention. The appended claims are intended to cover such modifications and arrangements.

What is claimed is:

1. A single-layer touchpad for providing input to a device, said single-layer touchpad comprised of:
    a transparent substrate;
    a first active electrode disposed on the transparent substrate in at least two discrete regions of a touch-sensitive area, wherein the first active electrode is generally transparent;
    a sense electrode disposed on a same side of the transparent substrate and adjacent to the first active electrode in the at least two discrete regions, wherein the sense electrode is generally transparent, and wherein the sense electrode does not overlap the first active electrode; and
    a touchpad sensing circuit coupled to the first active electrode and to the sense electrode to thereby provide at least some touchpad functionality to the device.

2. The single-layer touchpad as defined in claim 1 wherein the first active electrode includes material that makes the first active electrode visible.

3. The single-layer touchpad as defined in claim 2 wherein the first active electrode is formed in a desired pattern or shape such that the desired pattern or shape is visible.

4. The single-layer touchpad as defined in claim 1 wherein the sense electrode includes material that makes the sense electrode visible.

5. The single-layer touchpad as defined in claim 4 wherein the sense electrode is formed in a desired pattern or shape such that the desired pattern or shape is visible.

6. The single-layer touchpad as defined in claim 1 wherein the single-layer touchpad is further comprised of a grounding electrode, wherein the grounding electrode shields the first active electrode and the sense electrode from interference.

7. The single-layer touchpad as defined in claim 1 wherein the touchpad sensing circuit is capable of providing limited touchpad functionality.

8. The single-layer touchpad as defined in claim 7 wherein the touchpad sensing circuit is only capable of providing touch detection in the at least two discrete regions.

9. The single-layer touchpad as defined in claim 1 wherein the device further comprises a display screen, wherein the single-layer touchpad is at least partially disposed over the display screen, wherein the display screen is visible through the transparent substrate.

10. The method as defined in claim 1 wherein the method further comprises the step of providing limited touchpad functionality to the single-layer touchpad, wherein the single-layer touchpad is only capable of detecting an object touching one of the at least two discrete regions.

11. A method for providing a single-layer touchpad in an electronic appliance in order to provide limited touchpad functionality, said method comprising the steps of:
    (1) providing a transparent substrate;
    (2) disposing a first active electrode on the transparent substrate in at least two discrete regions of a touch-sensitive area, wherein the first active electrode is generally transparent;
    (3) disposing a sense electrode on a same side of the transparent substrate and adjacent to the first active electrode in the at least two discrete regions, wherein the sense electrode is generally transparent, and wherein the sense electrode does not overlap the first active electrode;
    (4) coupling a touchpad sensing circuit to the first active electrode and to the sense electrode; and
    (5) determining in which of the least two discrete regions a user makes contact with the touch-sensitive area to thereby provide limited touchpad functionality to the electronic appliance.

12. The method as defined in claim 11 wherein the method further comprises the step of making the first active electrode visible to a user by modifying material used for the first active electrode.

13. The method as defined in claim 12 wherein the method further comprises the step of forming the first active electrode in a desired shape or pattern to thereby enable a user to see the desired shape or pattern when using the single-layer touchpad.

14. The method as defined in claim 13 wherein the method further comprises the step of modifying the first active electrode by selecting a method of modifying the first electrode from the methods of increasing width, increasing thickness, or adding a material to darken the first active electrode.

15. The method as described in claim 11 wherein the method further comprises the step of making the sense electrode visible to a user by modifying material used for the sense electrode.

16. The method as defined in claim 15 wherein the method further comprises the step of forming the sense electrode in a desired shape or pattern to thereby enable a user to see the desired shape or pattern when using the single-layer touchpad.

17. The method as defined in claim 16 wherein the method further comprises the step of modifying the sense electrode by selecting a method of modifying the sense electrode from the methods of increasing width, increasing thickness, or adding a material to darken the sense electrode.

18. The method as defined in claim 11 wherein the method further comprises the step of providing a grounding electrode to thereby shield the first active electrode and the sense electrode from interference.

19. The method as defined in claim 11 wherein the method further comprises the steps of:
   (1) providing a display screen on the electronic appliance; and
   (2) disposing the single-layer touchpad at least partially over the display screen, wherein the display screen is visible through the transparent substrate.

20. The method as defined in claim 11 wherein the method further comprises the step of forming the first active electrode as a particular logo or brand name to thereby utilize the single-layer touchpad to advertise the particular logo or brand name.

* * * * *